United States Patent [19]

Kurita

[11] Patent Number: 5,656,901
[45] Date of Patent: Aug. 12, 1997

[54] REACTION FORCE GENERATING APPARATUS

[75] Inventor: Koji Kurita, Ichinomiya, Japan

[73] Assignee: Kokusai Dengyo Co., Ltd., Aichi-Ken, Japan

[21] Appl. No.: 432,362

[22] Filed: Apr. 21, 1995

[30] Foreign Application Priority Data

Apr. 22, 1994 [JP] Japan ................... 6-084626

[51] Int. Cl.$^6$ ................... A63F 9/00; H02K 33/18
[52] U.S. Cl. ................... 318/436; 318/2; 318/114; 318/119; 434/45
[58] Field of Search ................... 318/254, 489, 318/561, 566, 1, 2, 686, 689, 114, 119, 122, 123, 124, 128, 129, 436, 460; 434/45, 62; 180/79.1, DIG. 1, DIG. 3

[56] References Cited

U.S. PATENT DOCUMENTS

| | | |
|---|---|---|
| 3,762,491 | 10/1973 | Meyer . |
| 4,001,659 | 1/1977 | Shipman ................... 318/119 |
| 4,455,515 | 6/1984 | Uzuka ................... 318/254 |
| 4,467,262 | 8/1984 | Curtiss ................... 318/811 |
| 4,642,539 | 2/1987 | Hinds . |
| 4,730,150 | 3/1988 | Lee et al. ................... 318/254 |
| 4,884,016 | 11/1989 | Aiello ................... 318/685 |
| 4,928,043 | 5/1990 | Plunkett ................... 318/254 |
| 5,013,985 | 5/1991 | Itoh et al. ................... 318/254 X |
| 5,036,264 | 7/1991 | Ueki ................... 318/254 |
| 5,044,956 | 9/1991 | Behensky ................... 434/45 |

FOREIGN PATENT DOCUMENTS

| | | |
|---|---|---|
| 0 375 050 | 6/1990 | European Pat. Off. . |
| 2 580 101 | 10/1986 | France . |
| 2346386 | 3/1974 | Germany . |
| 32 21 048 | 12/1983 | Germany . |
| 2-98392 | 4/1990 | Japan . |
| 2-114982 | 4/1990 | Japan . |
| 2-271382 | 11/1990 | Japan . |
| 4-92691 | 3/1992 | Japan . |
| 4-232829 | 8/1992 | Japan . |

OTHER PUBLICATIONS

Machine Design, vol. 61, No. 25, 7 Dec. 1989, pp. 97–100, XP 000085119, Fleisher W A 'Brushless Motors for Limited Rotation'.

*Primary Examiner*—Bentsu Ro
*Attorney, Agent, or Firm*—Davis and Bujold

[57] ABSTRACT

A reaction force generating apparatus is provided which generates a reaction force for a rotationally operated member to be manually or mechanically operated. An alternating motor is provided that has a stator with three-phase coils; a rotor including permanent magnets; and a rotational axle extending from the center of the rotor and having a rotationally operated member attached to its one end. A direct voltage is supplied to the three-phase coils of the alternating motor, thereby producing a magnetic field on the stator. The magnetic field is oriented in one direction and cooperates with the permanent magnets to generate an electromagnetic attraction force for maintaining the operated member in a predetermined angular position. When the operated member is moved, a torque, or reaction force, is generated to restore the initial position of the operated member.

13 Claims, 9 Drawing Sheets

REACTION FORCE GENERATING APPARATUS

FIELD OF THE INVENTION

This invention relates to a reaction force generating apparatus which generates a rotational reaction force for a rotational member that is either manually or mechanically operated.

BACKGROUND OF THE INVENTION

Various reaction force generating apparatuses have been conventionally incorporated into driving game machines that simulate driving. Specifically, in such driving game machines, the vehicle on the screen turns right or left when a player rotates a steering wheel of the game machine. The steering wheel is provided with a reaction force, so that the player feels as if he or she is actually driving a vehicle.

In order to provide a reaction force for steering wheel of the driving game machine, various methods have been proposed, including the Japanese Unexamined Patent Publications Nos. 2-98392 and 2-114982 in which the force is generated by means of springs, and Japanese Unexamined Patent Publications Nos. 2-271382, 4-232829 and 4-92691 in which the reaction force for steering wheels is generated by the rotational outputs of a direct current motor.

Arm gears of training machines for building muscles also incorporate springs to create a reaction force when the arm gears are rotated.

In methods utilizing springs to generate a reaction force, the obtained reaction force merely operates to reinstate the steering wheel of driving game machine or the arm gear of training machine to its original position. In addition, an urging force provided by means of a spring(s) deteriorates over an extended period of use.

Methods that generate reaction forces with the rotational force of direct current motors have the advantage that various reaction forces can be generated by controlling the rotational direction of the direct current motor and its torque. However, every time the direction of the reaction force needs to be changed, so does the direction of the electric current to be supplied to the direct current motor. Consequently, their control circuit and control method are relatively complicated.

SUMMARY OF THE INVENTION

Wherefore, an object of the present invention is to provide a durable and simple-structured reaction force generating apparatus for generating a reaction force for rotationally operated members.

In order to attain the stated object, the reaction force generating apparatus according to the present invention generates a reaction force for an operated member that is rotationally operated and includes: an alternating motor, including: a stator having a plurality of coils that collectively form a multi-phase coil and generate a rotational magnetic field when supplied with a multi-phase alternating current, a rotor having permanent magnets mounted thereto, and a rotational axle extending from the center of the rotor to the outside of the motor casing, and actuating means for supplying the multi-phase coils of the alternating motor with a predetermined direct current to generate a magnetic field that attracts the magnets and thereby maintain the rotational axle in a predetermined angular position, wherein the operated member is fixed to the rotational axle of the alternating motor.

In the present arrangement, each coil of the alternating motor is fed, not with an alternating current, but with a direct current to generate a magnetic field oriented in one direction at the stator. An electromagnetic attraction force is created between the magnetic field and the permanent magnets, which maintains the rotor, and thereby the operated member fixed thereto, in a predetermined angular position.

When the operated member is rotated in either direction, an angle is formed between the magnetic field produced by the stator and the magnetic axis at the rotor and a torque is produced that attracts the rotor back to the stop position. The torque creates a rotational reaction force on the operated member. The larger the angle between the magnetic field and the magnetic axis of the rotor, the larger the resulting torque becomes.

The stop position of the rotor can be changed by varying the value of the direct current to be supplied to the multi-phase coils, and thereby changing the direction of the magnetic field generated by the stator. Since commutator, brush and other mechanical sliding members that are present on direct current motors can be disposed with when using an alternating motor, the apparatus of the present invention is superior in durability than prior art devices containing direct current motor.

The present invention also proposes the above described reaction force generating apparatus in which the direct current to be supplied to each of the multi-phase coils of the alternating motor is alternately changed at a predetermined frequency over a predetermined time period. The preferred frequency of oscillation between the alternating currents would be, for instance, 5 cycles per second.

Since the stop position to which the rotor is attracted is changed by varying the value of direct current to be supplied to the multi-phase coils, the operated member can be rotationally vibrated during the predetermined time period by alternately varying the direct current that is supplied to the coils at the predetermined frequency.

If such an apparatus is adopted into the steering wheel of a driving game machine, it is possible to imitate the waggle of a steering wheel during driving on a rough unpaved road. If such an apparatus is adopted into the arm gear of a training machine, an appropriate amount of vibration can be provided to the trainee. It is not required that the above mentioned predetermined frequency and time period be a fixed value, they may be gradually shifted, for instance the time period may be one seconds, three seconds or half a second.

The present invention further proposes reaction force generating apparatus as described above, in which: the permanent magnets are disposed on the outer peripheral surface of the rotor of the alternating motor; or the pole teeth provided in the stator are formed at an angle in relation to rotational axis of the rotor. In such an arrangement, the peripheral edges of the permanent magnets are not spatially parallel to the pole teeth which, when excited by the energized coils of the stator, define the magnetic poles of the magnetic field.

Therefore, even when the change in relative position between the magnetic poles of the magnetic field generated at the stator and the permanent magnets is small, a sufficient amount of torque is generated for the rotor. This is because the area on the permanent magnets that faces the magnetic poles of the stator is increased. In addition, the increase of area on the permanent magnets that is facing the magnetic poles of the stator takes place gradually, even when the peripheral edges of the permanent magnets are in the area where the distribution of magnetic flux density or magnetic vector generated by the coils of the stator, abruptly changes. Therefore, the torque can be gradually generated, without being affected by such abrupt changes. Accordingly, torque ripple, which is caused when the torque on the rotor is abruptly changed, is prevented.

Figure 10A:
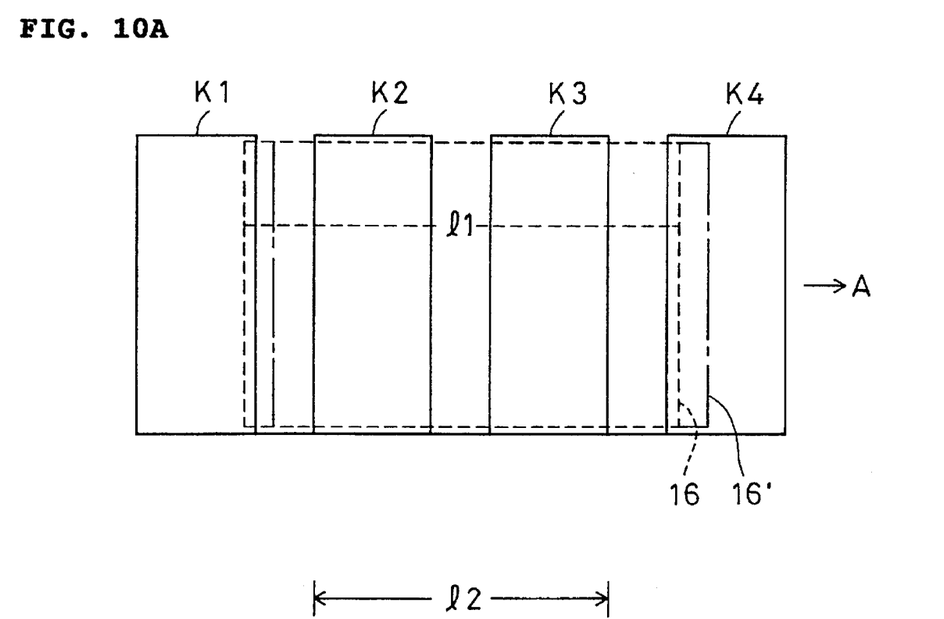
FIG. 10A illustrates the case in which the permanent magnets are not inclined.

Assume a case in which the permanent magnets have a relatively large surface area, for example, when the permanent magnet 16 and the pole teeth K1 through K4 are aligned in parallel and the length l1 of permanent magnetic 16 along their peripheral direction is longer than the area l2 of magnetic flux generated by the coils, as shown in FIG. 10A. In this case, if the change in relative position between the magnetic pole of the stator and the permanent magnets is small, a torque sufficient to rotate the rotor cannot be generated. The apparatus would thus fail to provide an adequate reaction force when the operated member is only slightly rotated and the permanent magnet is displaced to the position indicated by phantom lines 16', while a constant value of direct current is being supplied to the coils by the actuating means, or when there is only a slight change in the direct current supplied by the actuating means to the coils.

On the other hand, if the permanent magnets have a relatively small surface area, the magnetic force on the rotor would be weak and the torque would be minimal, resulting in an insufficient reaction force for the operated member. Of course, it is possible to install on the rotor permanent magnets having smaller surface areas but having a greater magnetic force. This is, however, a costly alternative.

Figure 10B:
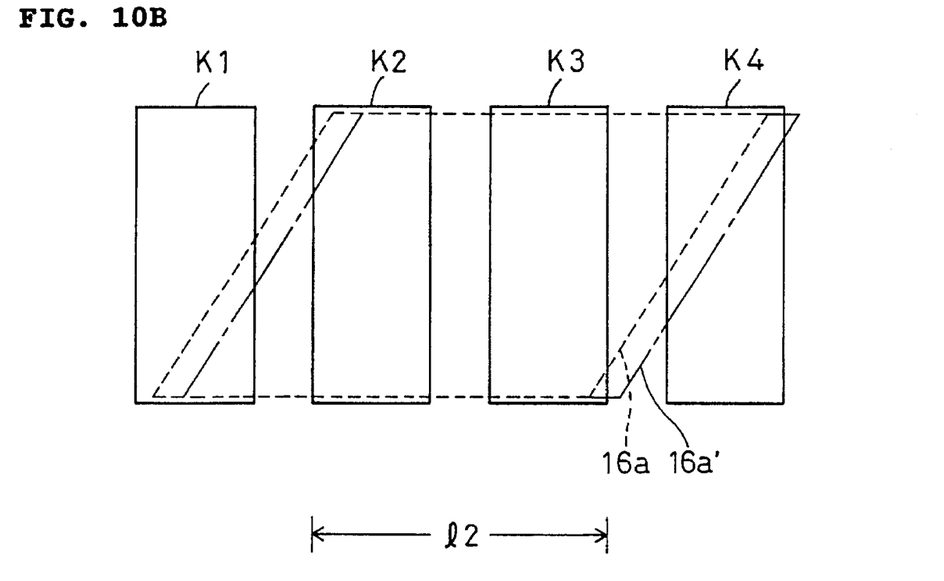
FIG. 10B illustrates the present invention in which the permanent magnets are inclined.

In contrast, the afore-described reaction force generating apparatus according to the present invention is operative even if the permanent magnets to be mounted on the rotor have a relatively large surface, equal to that of the magnet in FIG. 10A, area. This is due to the angled position of the peripheral edges of the permanent magnets in relation to the pole teeth, as shown in FIG. 10B. With this construction, any minor change in the relative position between the magnetic pole of the stator and the permanent magnets, i.e. from 16a to 16', results in an increase of the surface area on the permanent magnets that faces the magnetic pole generated by the stator. Therefore, even when the degree of rotation of the operated member is small, or even when the direct current supply by the actuating means to the coils is changed by a small value, the reaction force generated at the operated member has a sufficient value. Moreover, since the shift of areas on the permanent magnets where they oppose the magnetic pole of the stator is gradual, a rotational torque that increases and decreases gradually is generated at the rotor.

BRIEF DESCRIPTION OF THE DRAWINGS

FIGS. 5A, 5B, 5C and 5D are explanatory views illustrating the configuration of the permanent magnets mounted to the rotor of the alternating motor.

FIGS. 9A–9C are illustrations of a second embodiment with permanent magnets having a different configuration: FIGS. 10A and 10B are diagrammatic illustrations demonstrating how the inclined magnets of the present invention operate.

DETAILED DESCRIPTION OF THE PREFERRED EMBODIMENT

Figure 1:
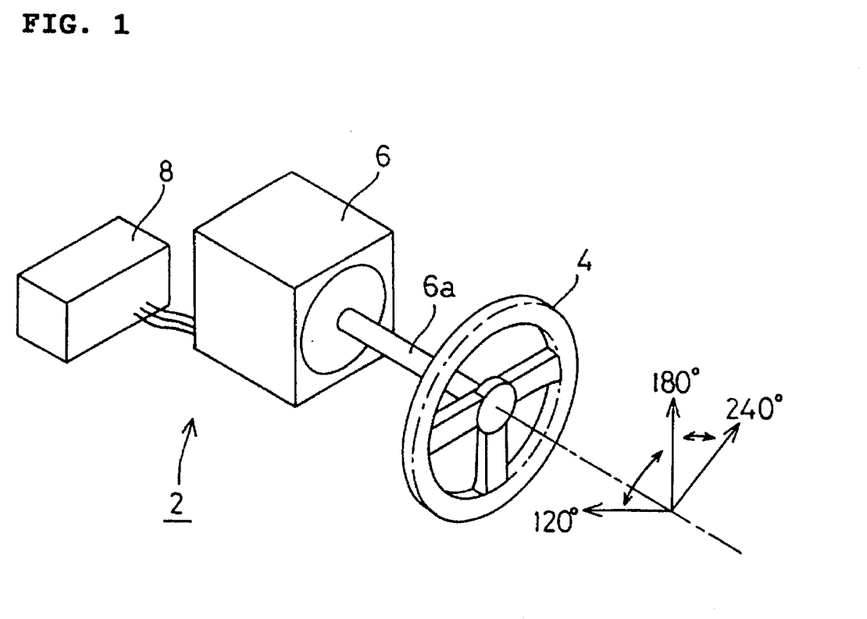
FIG. 1 is a schematic illustration of the construction of the reaction force generating apparatus according to the present invention.

Referring to FIG. 1, the reaction force generating apparatus 2 directly generates a reaction force for a steering wheel 4, which is rotationally operated by a player to steer a virtual vehicle to the right or left, on the screen of a not shown driving game machine which provides simulation of driving. The reaction force generating apparatus 2 includes a three-phase alternating motor 6 and a controller 8 which serves as actuating means for controlling the alternating motor 6.

The alternating motor 6 is fixed to the lower part of the screen of the game machine, with its rotational axle 6a projecting toward a driver's seat where a player is to be seated. A steering wheel 4 is fixedly mounted onto an end of the rotational axle 6a. The controller 8 supplies power to the alternating motor 6, in a manner which will be described later, in response to an instruction from a controlling computer controlling the driving game machine.

Figure 2:
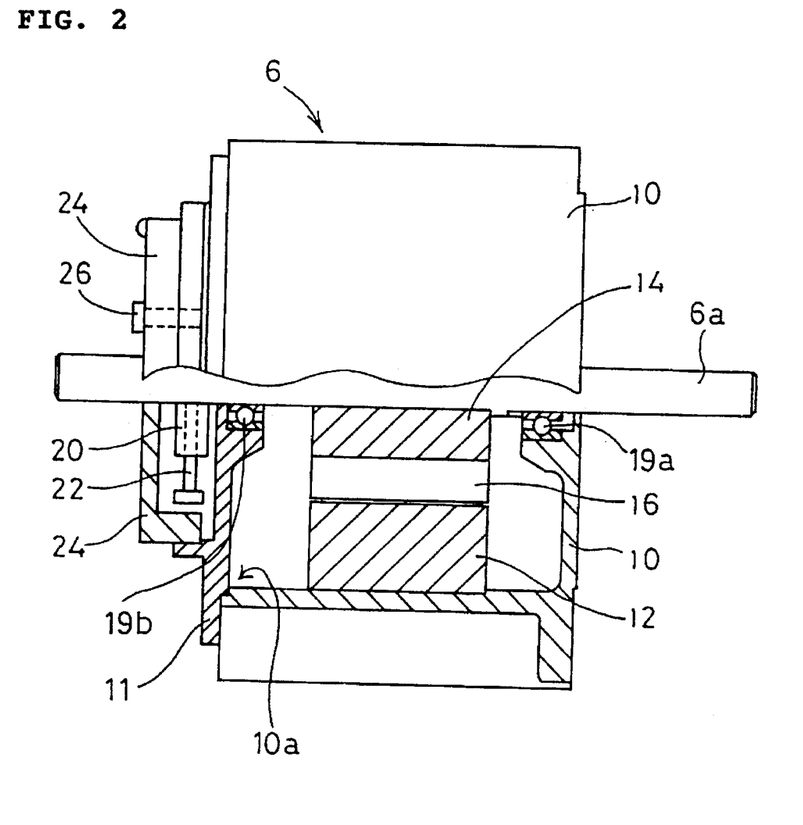
FIG. 2 is a schematic side view of the alternating motor, partially in section.

Turning to FIG. 2, the alternating motor 6 includes: a case 10 rotatably supporting the rotational axle 6a; a lid 11 for closing an open side 10a of the case 10 with the rotational axle 6a penetrating therethrough; stator 12 which is fixed to the inner peripheral surface of the case 10; rotor 14 which is made of iron and fixed to the outer periphery of the rotational axle 6a; and a pair of permanent magnets 16 and 18, not shown, which are mounted to the outer peripheral surface of the rotor 14. The rotational axle 6a is rotatably supported via a bearing 19a and a bearing 19b which are provided in the case 10 and the lid 11, respectively.

Adjacent to an end of the rotational axle 6a that is opposite to the steering wheel 4, that is to say an end that projects out of the lid 11, an internally threaded projection 20 is formed. The projection 20 is rotatable with the rotational axle 6a and has a first threaded member 22 screwed thereinto. A circular cap 24 is screwed into an end surface of the lid 11 so as to cover the projection 20 and the first threaded member 22. A second threaded member 26 is screwed through the cap 24 at a position thereon, such that when the rotational axle 6a is rotated, the first threaded member 22 and the second threaded member 26 abut against one another. A rotatable range of the rotational axle 6a is thus defined.

Figure 3:
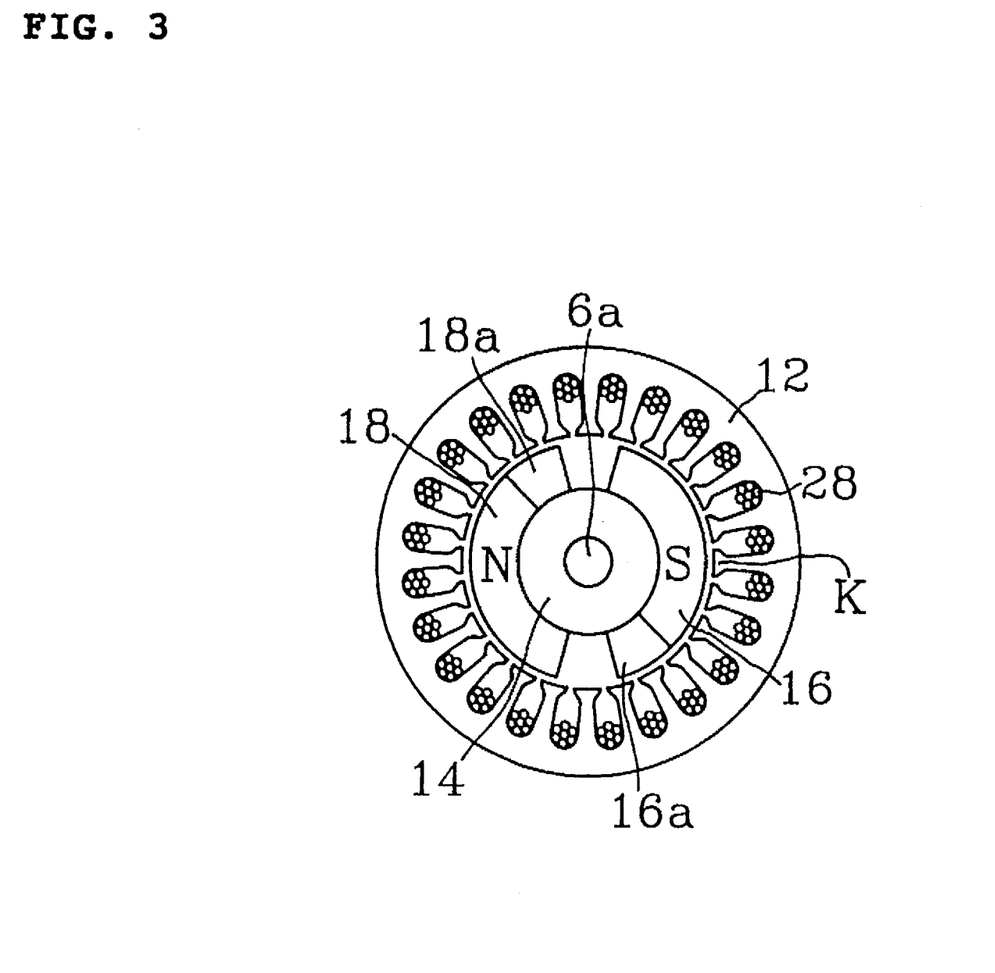
FIG. 3 is a schematic sectional view of the alternating motor.

As shown in FIG. 3, twenty four pole teeth K are formed in the stator 12. Also, the stator 12 has a known three-phase coil 28 wound therein, which is made of a U-phase, V-phase and W-phase. The pole teeth K on one half of the periphery of the stator 12 are magnetized to the north polarity, while the pole teeth K on the other half of the periphery are magnetized to the south polarity. Magnetic flux is thus generated between the two halves of the stator 12 and is alternated by 120 degrees when a voltage is applied alternately to the coils of each phase, such that the coils of the same phase are energized in turn. A first permanent magnet 16 and a second permanent magnet 18 are mounted onto the outer peripheral surface of the rotor 14, facing in opposite directions. The first permanent magnet 16 has its south polarity at the side facing the pole teeth K and its north polarity at the side facing the rotor 14. The second permanent magnet 18 has its north polarity at the side facing the pole teeth K and its south polarity at the side facing the rotor 14, respectively. It is noted in FIGS. 3 and 8 that, the legend "S" on the first permanent magnet 16 and the legend "N" on the second permanent magnet 18, respectively, represent the polarity of the magnets 16 and 18 at the side facing the pole teeth K.

According to the described arrangement, if alternating currents U, V and W, whose phases have a lag of 120 degree from one another, are applied to each coil, i.e. U-phase, V-phase and W-phase, of the three-phase coils 28, a rotational magnetic field is generated at the stator 12. As a result, the electromagnetic attraction force effected between the rotational magnetic field and first and second permanent magnets 16 and 18 will cause the rotor 14 to rotate. Thus, the alternating motor 6 has the same construction as a synchronized type alternating servo motor.

Nevertheless, the alternating motor 6 of the present embodiment has the following three differences in terms of application and construction, from the conventional alternating servo motors.

(1) First, unlike the conventional alternating servo motors where an alternating current is applied to each coil of the three-phase coils, in the present embodiment, the controller 8 supplies a direct current to each coil of the three-phase coils 28 to cause the direct current to run through each coil, as will be described later. In this way, a stationary magnetic field oriented in one direction is caused at the stator 12, such that the electromagnetic attraction force between the magnetic field and the first and second permanent magnets 16 and 18 causes the rotor 14, and thereby the steering wheel 4 fixed to the rotational axle 6a, to stop in a predetermined angular position.

Figure 4:
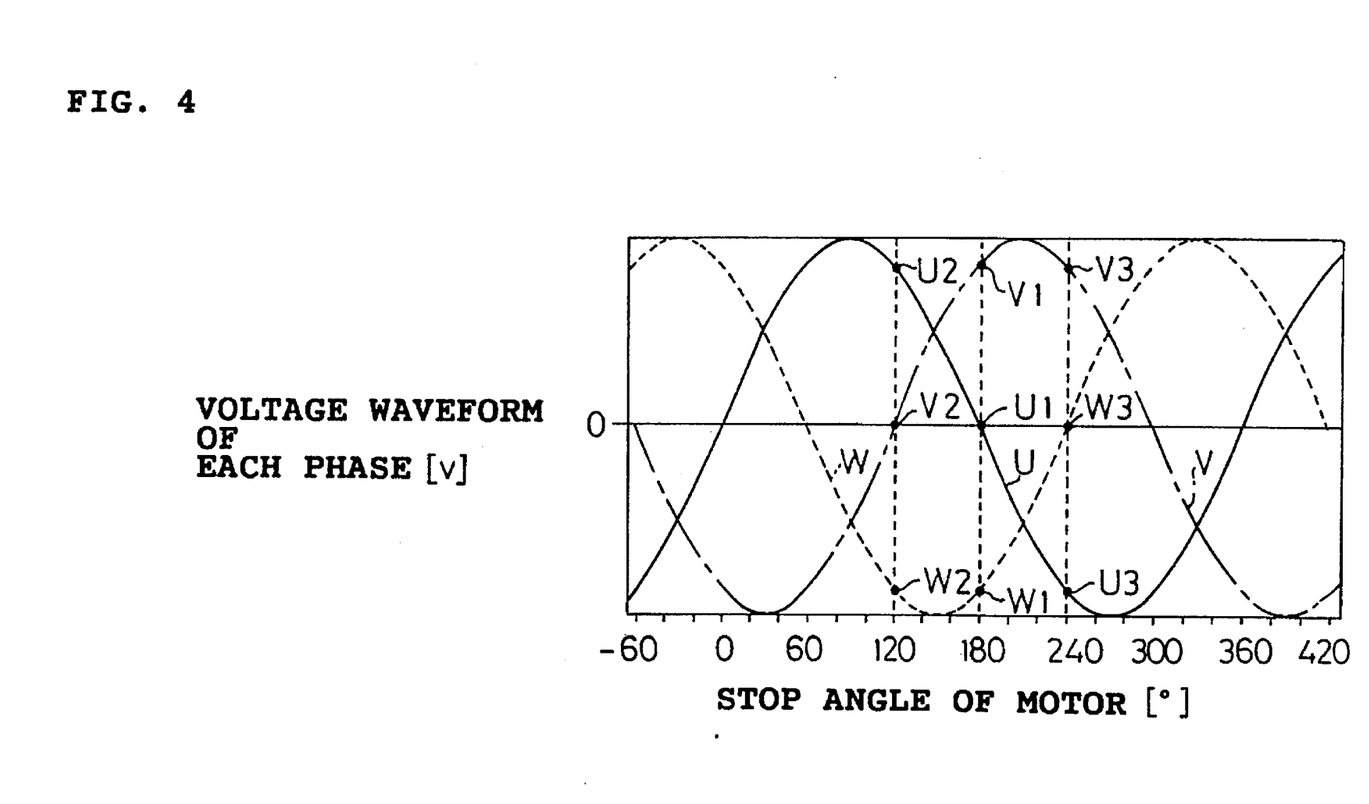
FIG. 4 is a chart plotting out the voltage values to be applied to the three-phase coils of the alternating motor.

The fixation of the steering wheel 4 on the rotational axle 6a is so arranged that the steering wheel 4 (rotational axle 16a) is orientated at a position corresponding to straight ahead steering of the vehicle on the screen when direct currents having values of U1, V1 and W1, as shown in FIG. 4, are respectively applied to each coil, U-phase, V-phase and W-phase, of the alternating motor 6 and the rotor 14 is at the stop angular position. The angular position of the rotor 14 when it is stopped will be hereinafter referred to as "stop angle at 180 degrees."

(2) Secondly, in contrast to the conventional servo motor, which is typically supplied with a power of 400 watts and in which the value of direct current resistance of each coil composing the three-phase coil is approximately 2 Ω, the value of the direct current resistance of each coil in the alternating motor 6 of the instant embodiment is as large as approximately 24 Ω. The coils are thus prevented from fusing even when a direct current runs therethrough. As will be noted, it is preferable to provide the present alternating motor with a direct current resistance of 5 to 20 times that of the common alternating motor of the same wattage.

Figure 5A:
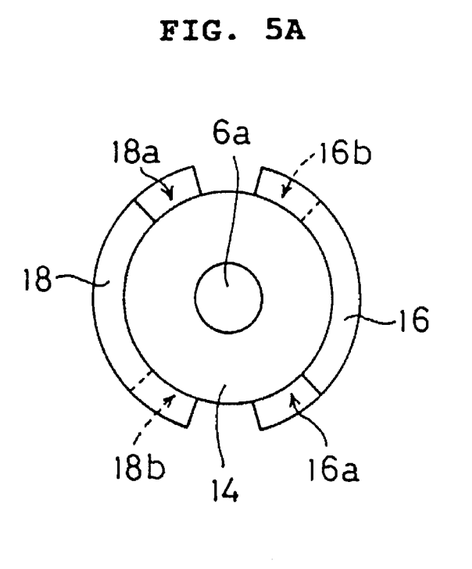
FIG. 5A is a front view of the rotor.
Figure 5B:
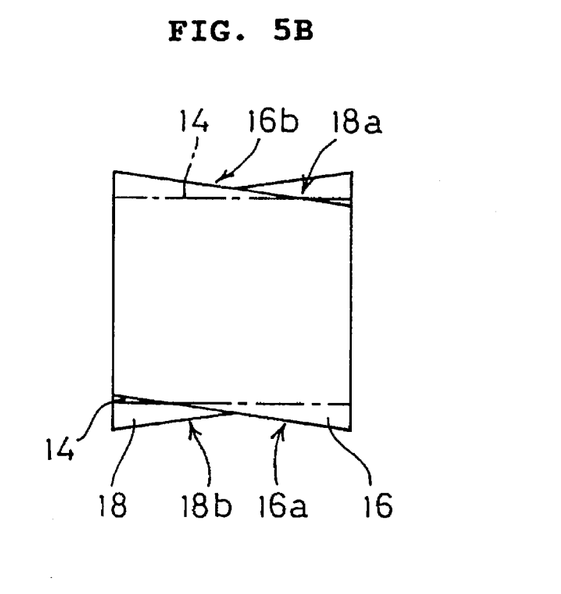
FIG. 5B is a right side view of the rotor.
Figure 5C:
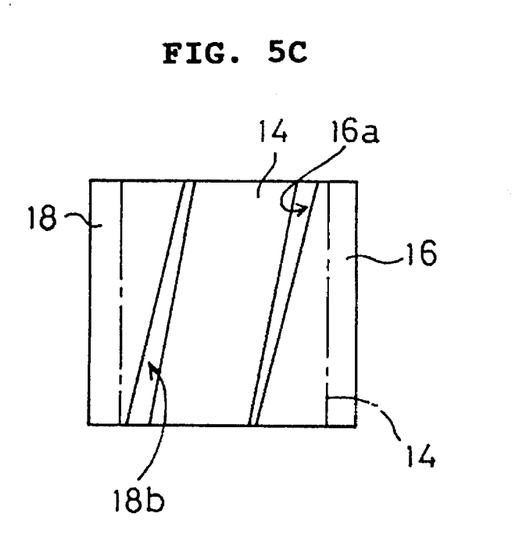
FIG. 5C is a bottom view in which the rotational axle is omitted and the reference numerals 16a, 16b, 18a and 18b represent angled peripheral edges of the permanent magnets.
Figure 5D:
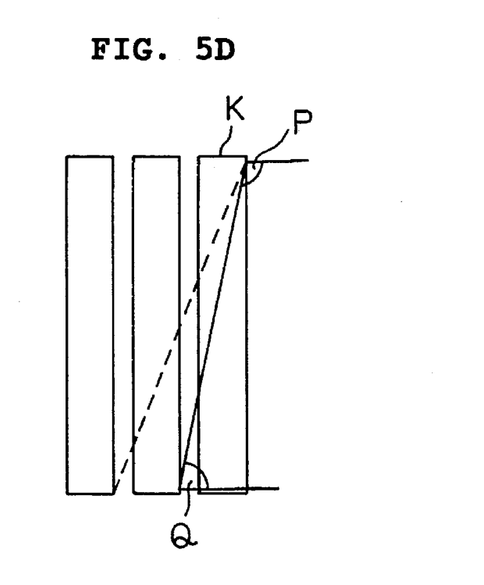
FIG. 5D is an illustration demonstrating the inclination of the permanent magnets.

(3) Further, as shown in FIGS. 5A, 5B and 5C, the first and second permanent magnets 16 and 18 of the instant embodiment are formed into parallelogrammatic magnets mounted along the outer peripheral surface of the rotor 14, such that the first and second permanent magnets 16 and 18 can be disposed at an angle relative to the rotational axis the rotor 14. As shown in FIG. 5D, the inclination of the permanent magnets is so arranged that an opposing pair of corners P,Q of the permanent magnets are displaced against one another by one or two pitch(es) of the aligned pole teeth K. The bold line in FIG. 5D represents the angle that displaces the corners P,Q by one pitch, and the broken line represents the angle that displaces the corners P,Q by two pitches. The angle may displace the corners by three or more pitches.

The aforementioned controller 8 supplies direct voltage to the three-phase coils 28 of the alternating motor 6.

Figure 6:
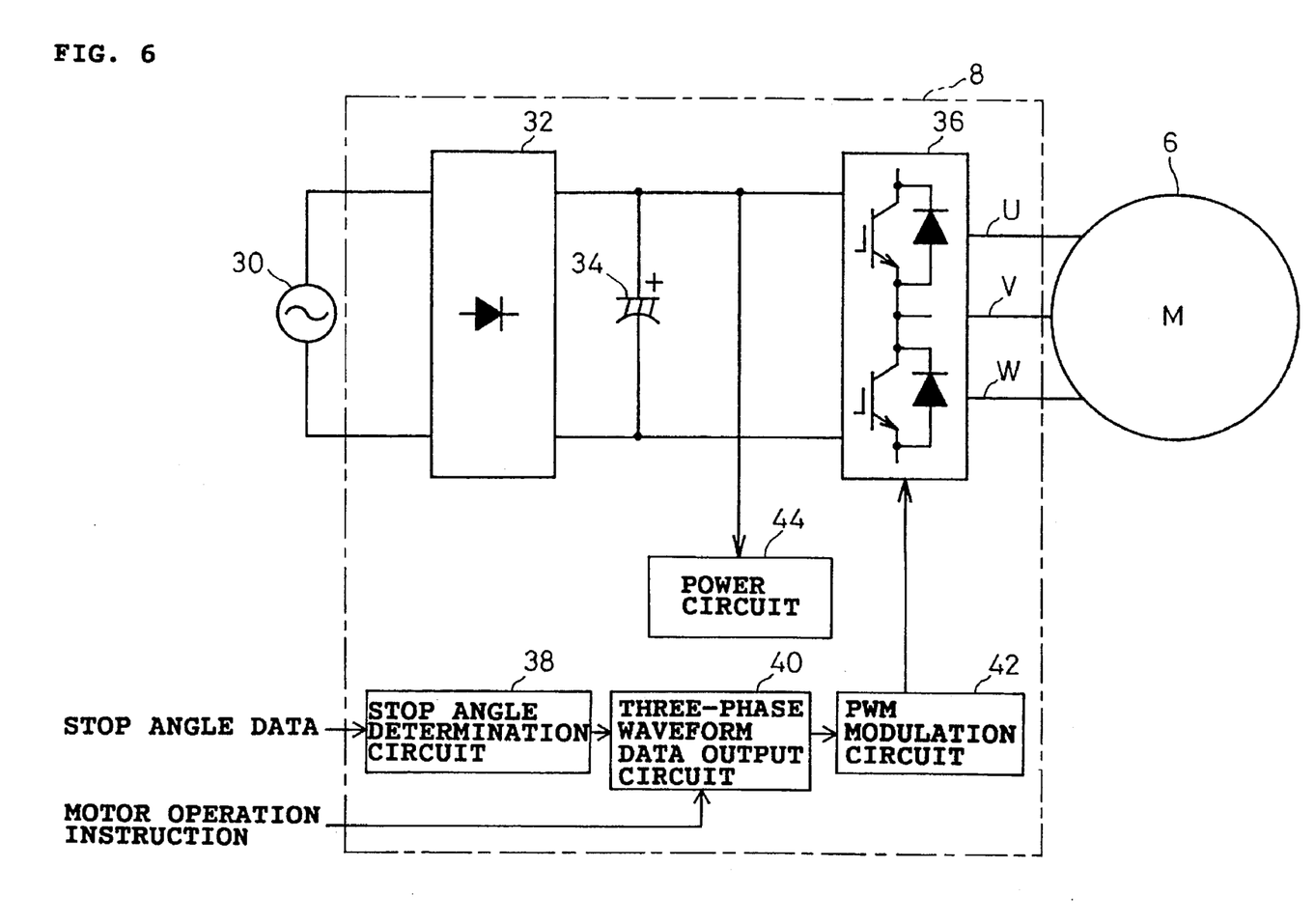
FIG. 6 is a schematic diagram of the controller which supplies power to the alternating motor.

As shown in FIG. 6, the controller 8 includes: rectifier circuit 32 for rectifying the voltage supplied from the alternating current power source 30 of the driving game machine into a direct voltage; smoothing condenser 34 for smoothing the rectified direct voltage; actuating circuit 36 for supplying each coil 28, U-phase, V-phase and W-phase, of the alternating motor 6 with a direct voltage corresponding to the duty ratio of the signal inputted from a PWM modulation circuit 42 which will be described later; stop angle determination circuit 38 for receiving stop angle data indicative of the angle at which the rotation axle 6a of the alternating motor 6 is stopped from a controlling computer controlling the driving game machine and for determining the stop angle based on the data; three-phase waveform data output circuit 40 for operating, when a motor operation instruction is received from the controlling computer, respective direct voltages in three phases corresponding to the stop angle determined by the stop angle determination circuit 38 and for outputting waveform data respectively indicative of the voltage values; PWM modulation circuit 42 for outputting a signal with a duty ratio corresponding to the voltage values indicated by the waveform data obtained at the three-phase waveform output circuit 40 and for causing the actuating circuit 36 to supply each coil 28 of the alternating motor 6 with a direct voltage corresponding to the stop angle determine at the stop angle determination circuit 38; and a power circuit 44 for supplying actuating power to the stop angle determination circuit 38, three-phase waveform data output circuit 40 and PWM modulation circuit 42.

The reaction force generating apparatus 2 operates in the following manner, referring to FIGS. 1, 7 and 8.

When power is supplied to the driving game machine, the controlling computer outputs a stop angle data of 180 degrees. Then, when a player starts the driving game machine, for example, by inserting coin(s), the controlling computer outputs a motor operation instruction, which is noted as t0 in FIG. 7, to the controller 8.

In response, the stop angle determination circuit 38 of the controller 8 determines that the stop angle designated by the controlling computer is 180 degrees. At the same time, the three-phase waveform data output circuit 40 operates respective direct voltages in three phases (U1, V1 and W1 of FIG. 4) corresponding to the stop angle of 180 degrees and outputs waveform data indicative of the voltage values.

Then, the PWM modulation circuit 42 outputs a signal of such a duty ratio corresponding to the waveform data, to the actuating circuit 36, and the actuating circuit 38 supplies each coil 28, U-phase, V-phase and W-phase, of the alternating motor 6 with direct voltages of U1, V1 and W1, respectively.

Figure 8:
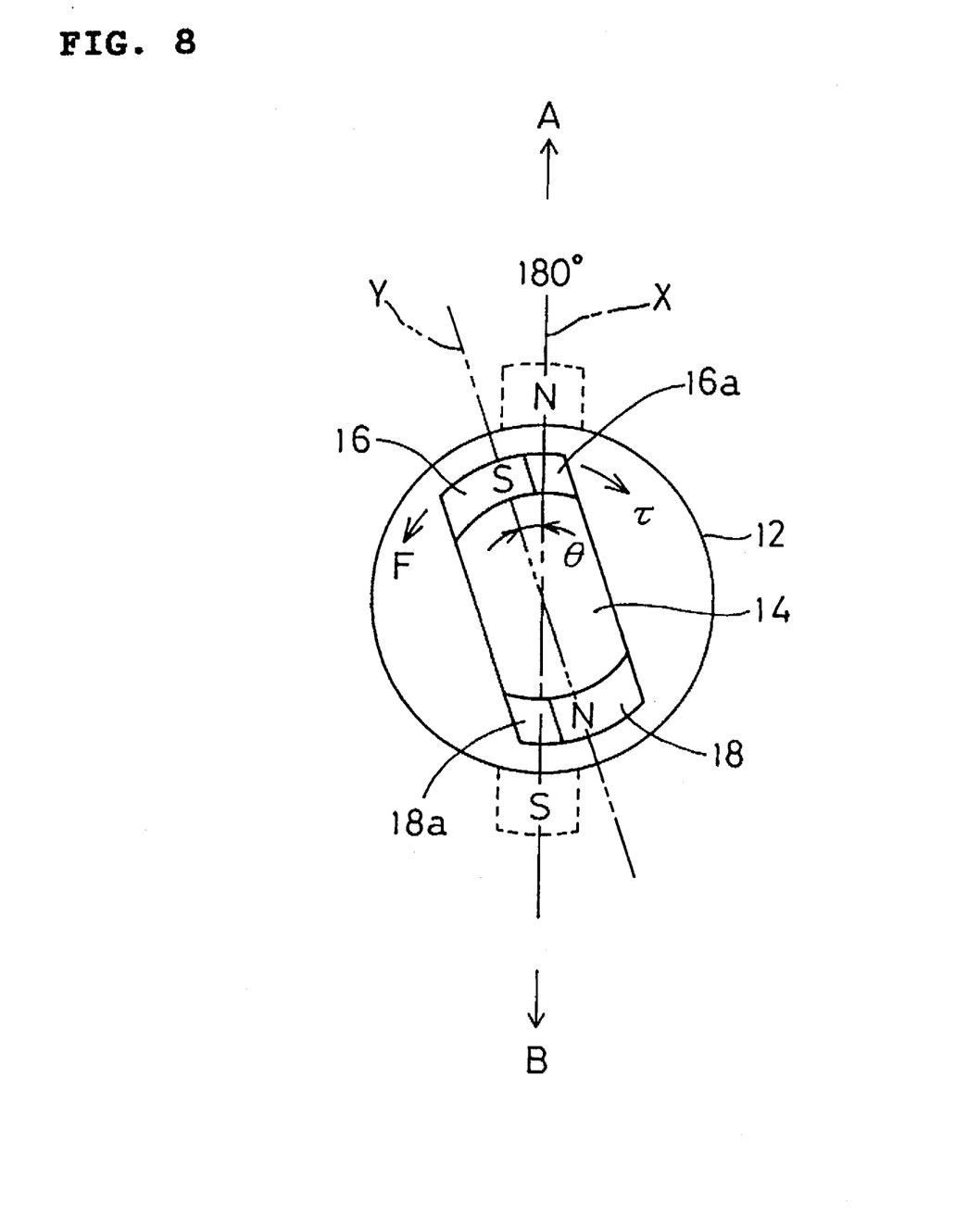
FIG. 8 is an illustration of the generation of the rotational reaction force.

When each coil 28 of the alternating motor 6 has received the direct voltages U1, V1 and W1 corresponding to the stop angle of 180 degrees, a magnetic field is generated, as shown in FIG. 8, in the direction A-B. A resultant electromagnetic attraction force caused between the magnetic field and the first and second permanent magnets 16 and 18 maintains the steering wheel 4 in the straight ahead position as shown in FIG. 1.

Assume a case where the player rotates the steering wheel 4 counterclockwisely to turn the vehicle on the screen to the left, the rotor 14, as shown in FIG. 8, is rotated in the direction indicated by arrow F. This increases the angle θ between the magnetic field direction X of the stator 12 and the magnetic axis Y of the rotor 14, thereby generating a torque τ urging the rotor 14 back to the stop angle of 180 degrees. Consequently, the torque τ serves as a reaction force for the steering wheel 4, and the player feels as if he or she is operating a real vehicle.

Figure 7:
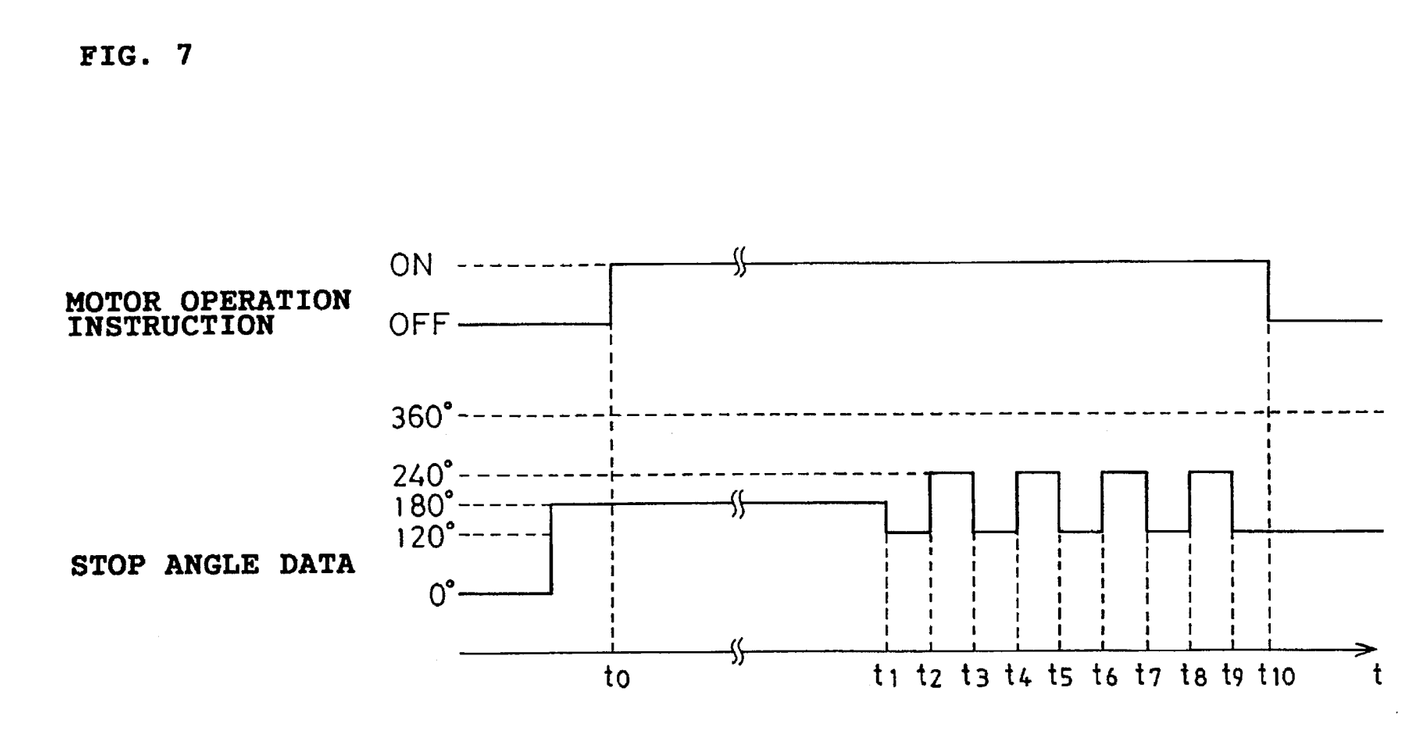
FIG. 7 is a time chart of the motor operation instruction and the stop angle data to be inputted by the controlling computer of the driving game machine to the controller.

Moreover, if the vehicle the player is operating hits a wall or other obstacles, the controlling computer alternately outputs to the controller 8 stop angle data of 120 degrees and stop angle data of 240 degrees, as shown by t1 through t9 in FIG. 7, in a predetermined frequency over a predetermined period of time, for example 0.2 seconds.

Responsively, the actuating circuit 36 of the controller 8 outputs to the each coil 28 of the alternating motor 6 direct voltages U2, V2, and W2 and direct voltages of U3, V3 and W3, respectively, corresponding to the stop angle of 120 degrees and stop angle of 240 degrees. As shown in FIG. 4, the direct voltages U2, V2 and W2 and direct voltages U3, V3 and W3 are of voltage values delayed and advanced, respectively, by 60 degrees with respect to the voltages U1, V1 and W1.

In this manner, when each coil 28 of the alternating motor 6 alternately receives the direct voltages U2, V2 and W2 and the direct voltages U3, V3 and W3, the direction of magnetic field generated at the stator 12 alternately shifts by 60 degrees with respect to the magnetic field direction X shown in FIG. 8. Hence, the difference between the respective magnetic field directions and the magnetic axis at the rotor 14 generates a torque, alternately to the right and left with respect to the stop angle of 180 degrees at the center.

Consequently, the steering wheel 4 is rotationally vibrated to the right and left, making the player feel an abrupt trembling of the steering wheel 4, so that he or she can recognize that the vehicle has collided against a wall or other obstacles.

When the game is over, the controlling computer gives off an instruction, t10 in FIG. 7, to the controller 8 to stop operation of the motor. Responsively, the three-phase waveform data output circuit 40 terminates its output of waveform data, thereby causing the PWM modulation circuit 42 and the actuating circuit 36 to stop their operation. Power supply to the alternating motor 6 is thus cut off.

As will be noted from the above description, in the reaction force generating apparatus 2 of the instant embodiment, each coil 28 of the alternating motor 6 receives, not an alternating current, but a direct current to generate a magnetic field oriented in one direction at the stator 12. The magnetic field cooperates with the first and second magnets 16 and 18 of the rotor 14 to generate an electromagnetic attraction force therebetween, which operates to hold the steering wheel 4 at the stop angle of 180 degrees. When the player rotates the steering wheel 4, a torque is generated to attract the rotor 14 back to the stop angle of 180 degrees. This torque serves as a rotational reaction force for the steering wheel 4.

According to the reaction force generating apparatus 2 of the instant embodiment, it is enabled to give a vibrating reaction force to the steering wheel 4, by using a simple construction in which each coil 28 of the alternating motor 6 is supplied with a given direct voltage (current). Moreover, since the alternating motor 6 does without a commutator, brush or other sliding members, the durability of the apparatus is enhanced relative to a direct current motor.

Furthermore, the vibration of the steering wheel 4 is automatically attained by shifting, in a predetermined frequency over a predetermined time period, the value of the direct voltage to be supplied to the each coil 28 of the alternating motor 6. Therefore, the player of the driving game machine can feel an abrupt trembling of the steering wheel 4, like those caused when a vehicle has collided against a wall.

Still further, the alternating motor 6 of the instant reaction force generating apparatus 2 has the parallelogrammatic first and second permanent magnets 16 and 18 which are arranged, as shown in FIGS. 5A, 5B and 5C, along the outer peripheral surface of the rotor 14 such that the peripheral edges of the first and second permanent magnets 16 and 18 are disposed at an angle relative to the rotational axis of the rotor 14. Because of the inclined peripheral edges 16a, 16b, 18a and 18b of the first and second permanent magnets 16 and 18, the area on the permanent magnets 16 and 18, within the magnetic field, that faces the magnetic poles of the stator 12 changes. A sufficient amount of torque can be generated at the rotor 14, even when the change in relative position between the magnetic poles (indicated by broken line in FIG. 8) of the magnetic field created by the stator 12 and the first and second permanent magnets 16 and 18 is small. In addition, because of the gradual change of the areas on the first and second permanent magnets 16 and 18 where they oppose the magnetic pole of the stator 12, the first and second permanent magnets 16 and 18 are prevented from being abruptly attracted to either of the pole teeth K to cause a so-called torque ripple, i.e. fluctuation of torque. A torque can be thus attained smoothly at the rotor 14.

On the other hand, if the first and second permanent magnets 16 and 18 had larger surface areas than the area of the magnetic field generated by the coils, and their peripheral edges were parallel to the rotational axis of the rotor 14 and the change of relative position between the magnetic pole of the stator 12 and the first and second permanent magnets 16 and 18 is small, a sufficient torque for the rotor 14 would not be generated. Therefore, in the vicinity of the stop angle of 180 degrees, the steering wheel 4 would have a wider play but no rotational reaction force. On the other hand, if the areas of the first and second permanent magnets 16 and 18 were smaller, the magnetic force at the rotor 14 would be scarce, resulting in an insufficient reaction force for the steering wheel 4.

In contrast, the reaction force generating apparatus 2 of the instant embodiment is operative even if the first and second permanent magnets 16 and 18 to be mounted on the rotor 14 have relatively large surface area. In this case, any change in the relative position between the magnetic pole of the stator 12 and the first and second permanent magnets 16 and 18 results in a change of surface area on the permanent magnets 16 and 18 that faces the magnetic poles of the stator 12. Therefore, even when the amount of rotational travel of the steering wheel 4 caused by the player is only a relatively small rotation from the stop angle of 180 degrees, or even when the voltage supply by controller 8 to the coils 28 is changed by a relatively small value, the reaction force generated at the steering wheel 4 is of a sufficient value. Moreover, since the change in the area on the first and second permanent magnets 16 and 18, where they oppose the magnetic pole of the stator 12, is gradual as the rotor 14 is rotated, an increasing torque is smoothly generated at the rotor 14.

Figure 9A:
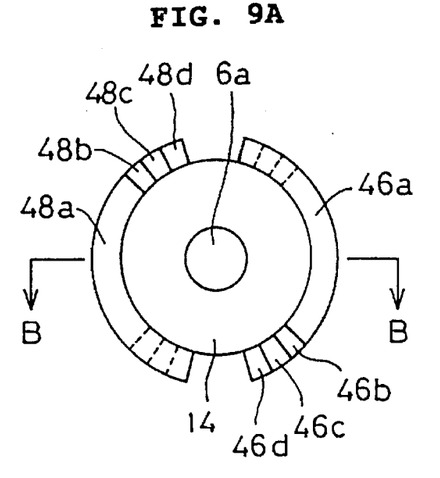
FIG. 9A is a front view of the rotor 14.
Figure 9B:
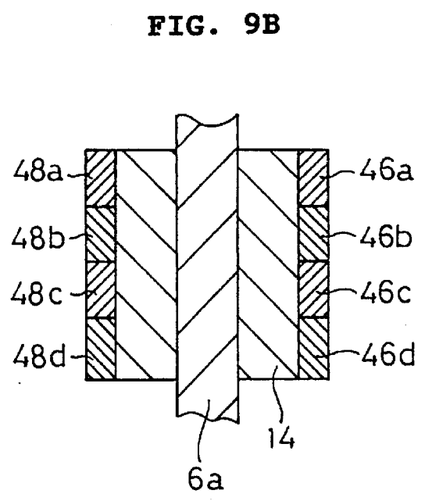
FIG. 9B is a sectional view taken along the line B—B of FIG. 9A.
Figure 9C:
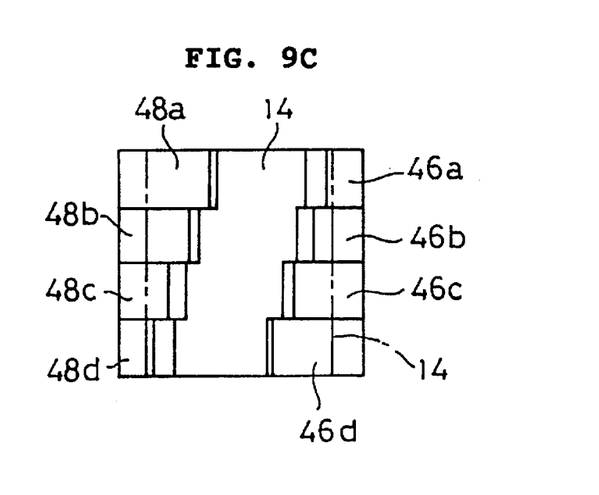
FIG. 9C is a bottom view of the rotor, in which the rotational axis is omitted.

The present invention has been described above with reference to the preferred embodiments as shown in the drawings. Modifications and alterations may become apparent to one who skilled in the art upon reading and understanding the specification. Despite the use of the embodiments for illustration purposes, the invention is intended to include all such modifications and alterations within the scope and spirit of the appended claims. In this spirit, it should also be noted that in the embodiments, the first and second permanent magnets 16 and 18 are parallelogrammatic members aligned along the outer peripheral surface of the rotor 14. However, it can be appreciated that the permanent magnets may be four semi-cylindrical members 46a–46d and 48a–48d, as shown in FIGS. 9A through 9C, that are disposed along the outer peripheral surface of the rotor 14 with a predetermined angle of lag, for example 10 degree. Since the permanent magnets 46a–46d, and 48a–48d in such arrangement are as a whole, in effect, disposed at an angle in relation to the rotational axis of the rotor 14, similar to the afore-described embodiment, a sufficient amount of reaction force can be smoothly generated for the steering wheel 4.

Further, instead of disposing the permanent magnets at angle relative to the rotational axis of the rotor 14, the pole teeth K of the stator 12 may be formed at an angle relative to the rotational axis of the rotor 14 to obtain the similar result.

Although the disclosed reaction force generating apparatus 2 is used for providing a rotational reaction force for the steering wheel 4 of a driving game machine, the present invention may be applied to other various members that are rotationally operated either manually or mechanically.

For instance, an acceleration pedal of the driving game machine may be fixed to the rotational axle 6a of the alternating motor 6 such that a rotational reaction force is provided for the acceleration pedal.

Furthermore, an arm gear of body building machine that is rotated manually may be fixed to the rotational axle 6a of the alternating motor 6. In this way, springs, rubber, or other mechanical urging members can be dispensed with in providing a reaction force for the arm gear. In this case, if the volume of power to the each coil 28 of the alternating motor 6 is made adjustable, a training person can set the training level in a non-stepwise manner.

The present invention is also applicable to members that are not manually rotated. Such members that are indirectly rotated by, for example, a link mechanism, may be fixed to the rotational axle 6a of the alternating motor 6 to attain a similar result.

Wherefore, having described the present invention, what is claimed is:

1. A reaction force generating apparatus for providing a reaction force for a rotationally operated member, said apparatus comprising:

an alternating motor including a stator having a plurality of coils which, when supplied with an alternating current, generate a rotational magnetic field, a rotor having at least one pair of permanent magnets mounted on an outer peripheral surface thereof, and a rotational axle fast with rotor and extending coaxially away from said rotor;

an actuating device coupled to said alternating motor to supply each of said plurality of coils of said alternating motor with a respective predetermined direct current to produce a stationary magnetic field that acts upon said magnets of said rotor and maintains said rotational axle in a predetermined angular position; and said rotationally operated member being fast with the outer end of said rotational axle; wherein
the actuating device includes a mechanism for alternately changing said direct current supplied to each of said plurality of coils of alternating motor at a predetermined frequency over a predetermined time period, resulting in a rotational vibration of said operated member, the severity of said rotational vibration being dependent upon said direct current, said predetermined frequency and said predetermined time period.

2. A reaction force generating apparatus for providing a reaction force for a rotationally operated member, said apparatus comprising:

an alternating motor including a stator having a plurality of coils which, when supplied with an alternating current, generate a rotational magnetic field, a rotor having at least one pair of permanent magnets mounted on an outer peripheral surface thereof, and a rotational axle fast with rotor and extending coaxially away from said rotor;

an actuating device coupled to said alternating motor to supply each of said plurality of coils of said alternating motor with a respective predetermined direct current to produce a stationary magnetic field that acts upon said magnets of said rotor and maintains said rotational axle in a predetermined angular position; and said rotationally operated member being fast with the outer end of said rotational axle; wherein
said permanent magnets extend at a helical angle about the axis of rotation of said rotor.

3. The reaction force generating apparatus according to claim 2, wherein said actuating device includes a mechanism for alternately changing said direct current supplied to each of said plurality of coils of said alternating motor at a predetermined frequency over a predetermined time period, resulting in a rotational vibration of said operated member, the severity of said rotational vibration being dependant upon said direct current, said predetermined frequency and said predetermined time period.

4. A reaction force generating apparatus for providing a reaction force for a rotationally operated member, said apparatus comprising:

an alternating motor including a stator having a plurality of coils which, when supplied with an alternating current, generate a rotational magnetic field, a rotor having at least one pair of permanent magnets mounted on an outer peripheral surface thereof, and a rotational axle fast with rotor and extending coaxially away from said rotor;

an actuating device coupled to said alternating motor to supply each of said plurality of coils of said alternating motor with a respective predetermined direct current to produce a stationary magnetic field that acts upon said magnets of said rotor and maintains said rotational axle in a predetermined angular position; and said rotationally operated member being fast with the outer end of said rotational axle; wherein said stator further includes a plurality of pole teeth which extend at a helical angle about the axis of rotation of said rotor.

5. The reaction force generating apparatus according to claim 4, wherein said actuating device includes a mechanism for alternately changing said direct current supplied to each of said plurality of coils of said alternating motor at a predetermined frequency over a predetermined time period, resulting in a rotational vibration of said operated member, the severity of said rotational vibration being dependant upon said direct current, said predetermined frequency and said predetermined time period.

6. The reaction generating apparatus of claim 4, wherein said plurality of pole teeth on said stator are not spatially parallel to said permanent magnets thereby increasing the area on said permanent magnets that face said magnetic poles of said stator to produce a desired rotational reaction force.

7. A method of generating a reaction force for a rotationally operated member, comprising the steps of:

providing an alternating motor including a stator having a plurality of coils which, when supplied with an alternating current, generate a rotational magnetic field, a rotor having at least a pair of permanent magnets mounted on an outer peripheral surface thereof, and a rotational axle fast with said rotor and extending coaxially away from said rotor where said rotationally operated member is fixed to the outer end of said rotational axle;

applying a respective predetermined direct current to each of said plurality of coils of said alternating motor;

producing a stationary magnetic field that acts upon said magnets of said rotor; and maintaining said rotational axle in a predetermined angular position; further comprising the step of alternately changing said direct current supplied to each of said plurality of coils of said alternating motor at a predetermined frequency over a predetermined time period, resulting in a rotational vibration of said operated member, the severity of said rotational vibration being dependant upon said direct current, said predetermined frequency and said predetermined time period.

8. A method of generating a reaction force for a rotationally operated member, comprising the steps of:

providing an alternating motor including a stator having a plurality of coils which, when supplied with an alternating current, generate a rotational magnetic field, a rotor having at least a pair of permanent magnets mounted on an outer peripheral surface thereof, and a rotational axle fast with said rotor and extending coaxially away from said rotor where said rotationally operated member is fixed to the outer end of said rotational axle;

applying a respective predetermined direct current to each of said plurality of coils of said alternating motor;

producing a stationary magnetic field that acts upon said magnets of said rotor; and maintaining said rotational axle in a predetermined angular position; further comprising the step of disposing said permanent magnets at a helical angle relative about the axis of rotation of said rotor.

9. The method of generating a reaction force according to claim 8, further comprising the step of alternately changing said direct current supplied to each of said plurality of coils of said alternating motor at a predetermined frequency over a predetermined time period, resulting in a rotational vibration of said operated member, the severity of said rotational vibration being dependent upon said direct current, said predetermined frequency and said predetermined time period.

10. A method of generating a reaction force for a rotationally operated member, comprising the steps of:

providing an alternating motor including a stator having a plurality of coils which, when supplied with an alternating current, generate a rotational magnetic field, a rotor having at least a pair of permanent magnets mounted on an outer peripheral surface thereof, and a rotational axle fast with said rotor and extending coaxially away from said rotor where said rotationally operated member is fixed to the outer end of said rotational axle;

applying a respective predetermined direct current to each of said plurality of coils of said alternating motor;

producing a stationary magnetic field that acts upon said magnets of said rotor; and maintaining said rotational axle in a predetermined angular position; further comprising the step of providing said stator with a plurality of pole teeth and disposing said pole teeth at a helical angle relative about the axis of rotation of said rotor, said plurality of coils being wound around said pole teeth.

11. The method of generating a reaction force according to claim 10, further comprising the step of alternating changing said direct current supplied to each of said plurality of coils of said alternating motor at a predetermined frequency over a predetermined time period, resulting in a rotational vibration of said operated member, the severity of said rotational vibration being dependant upon said direct current, said predetermined frequency and said predetermined time period.

12. A reaction force generating apparatus for providing a reaction force for a rotationally operated member, said apparatus comprising:

an alternating motor including a stator having a plurality of coils which, when supplied with an alternating current, generate a rotational magnetic field, a rotor having at least one pair of permanent magnets mounted on an outer peripheral surface thereof, and a rotational axle fast with rotor and extending coaxially away from said rotor;

an actuating device coupled to said alternating motor to supply each of said plurality of coils of said alternating motor with a respective predetermined direct current to produce a stationary magnetic field that acts upon said magnets of said rotor and maintains said rotational axle in a predetermined angular position; and said rotationally operated member being fast with the outer end of said rotational axle; wherein the actuating device includes a means for alternately changing said direct current supplied to each of said plurality of coils of said alternating motor, said means include delivering a set of direct voltages to each of said plurality of coils corresponding to two different stop angles defining an angular range at a predetermined frequency over a predetermined time period, resulting in a rotational vibration of said operated member, the severity of said rotational vibration being dependant upon said direct current, said predetermined frequency and said predetermined time period.

13. A reaction force generating apparatus for providing a reaction force for a rotationally operated member, said apparatus comprising:

an alternating motor including a stator having a plurality of coils which, when supplied with an alternating current, generate a rotational magnetic field, a rotor having at least one pair of permanent magnets mounted on an outer peripheral surface thereof, and a rotational axle fast with rotor and extending coaxially away from said rotor;

an actuating device coupled to said alternating motor to supply each of said plurality of coils of said alternating motor with a respective predetermined direct current to produce a stationary magnetic field that acts upon said magnets of said rotor and maintains said rotational axle in a predetermined angular position; and said rotationally operated member being fast with the outer end of said rotational axle; wherein said permanent magnets include a first permanent magnet and a second permanent magnet and when excited by said coils of said stator define more than one magnetic pole of said magnetic field, wherein said permanent magnets are arranged along an outer peripheral edge of said rotor such that a peripheral edge of said first permanent magnet and a peripheral edge of said second permanent magnet are disposed at a helical angle about the axis of rotation of said rotor, wherein said peripheral edges of said permanent magnets are not spatially parallel to a plurality of pole teeth on said stator thereby increasing the area on said permanent magnets that face said magnetic poles of said stator to produce a desired rotational reaction force.

* * * * *